United States Patent Office 3,076,755
Patented Feb. 5, 1963

3,076,755
REGENERATION PROCESS
Thomas M. Stark, Roselle, Charles W. Siegmund, Linden, and John Sosnowski, Westfield, N.J., assignors to Esso Research and Engineering Company, a corporation of Delaware
No Drawing. Filed Aug. 31, 1959, Ser. No. 836,918
8 Claims. (Cl. 208—216)

This invention relates to the hydrofining of hydrocarbon fractions. More particularly this invention pertains to an improved method for regenerating catalysts that have become spent in the hydrofining of hydrocarbon fractions.

Hydrofining is a well known process for the treatment of a variety of hydrocarbon fractions in order to improve various properties thereof. For example, naphtha fractions are subjected to hydrofining to remove sulfur and nitrogen compounds which may interfere with or adversely affect the hydroforming of such naphtha fractions with platinum alumina catalysts. Kerosene, heating oil, diesel fuel, lubricating oils as well as paraffin and microcrystalline waxes are subjected to hydrofining to improve color, odor, burning characteristics, storage stability or the like. The hydrofining treatment comprises maintaining the particular material in liquid, vapor or mixed liquid-vapor form in admixture with hydrogen at elevated temperatures and pressures in contact with a suitable hydrofining catalyst for a period sufficient to effect the desired improvement.

A variety of catalysts have been proposed for hydrofining such materials including molybdenum oxide, nickel-tungsten sulfide and most frequently cobalt molybdate or mixtures of cobalt oxide and molybdenum oxide dispersed upon an alumina-containing support or base, preferably activated or adsorptive alumina. In general, such catalysts are prepared by first forming adsorptive alumina particles in any suitable or known way and then compositing molybdenum oxide and cobalt oxide therewith. The molybdenum oxide can, for example, be added as a slurry or it may be applied as a solution of ammonium molybdate or molybdic acid. The cobalt oxide is conveniently added as a salt such as cobalt nitrate or acetate, salts which are readily decomposed to cobalt oxide and volatile materials. The cobalt oxide and molybdenum oxide may be provided in equimolar amounts or a molecular excess of one over the other may be used. Suitable catalysts contain from about 5 to about 25 wt. percent of cobalt oxide and molybdenum oxide with the ratio of the former to the latter in the range of from about one to five to about five to one.

The hydrofining reaction conditions vary somewhat depending upon the nature of the feed stock, the character and quantity of the impurity or contaminant to be removed and the degree of improvement desired.

The hydrofining reaction conditions for a variety of feed stocks are summarized in the following table.

|  | Naphtha | Kerosene | Diesel | Microcrystalline Wax |
|---|---|---|---|---|
| Reaction Temp., °F. | 500-700 | 550-625 | 640-700 | 400-650 |
| (Preferred) | (575) | (600) | (685) | (600) |
| Reaction Pressure, p.s.i.g. | 50-500 | 150-400 | 150-600 |  |
| (Preferred) | (300) | (200) | (200) | (600) |
| Feed Rate, v./v./Hr. | 1-20 | 0.5-4 | 0.5-25 | 0.5-3 |
| (Preferred) | (4) | (2) | (1) | (½) |
| Treat Gas Rate, s.c.f./b. | 30-3,000 | 300-1,000 | 500-1,600 | 50-5,000 |
| (Preferred) | (500) | (500) | (900) | (500) |
| Hydrogen Consumption, s.c.f./b. | 1-600 | 50-200 | 100-300 | 10-100 |
| (Preferred) | (50-20) | (50) | (150) |  |

In the hydrofining of the foregoing hydrocarbon fractions under the conditions described, there is a gradual deactivation of the catalyst due to the accumulation of carbonaceous or other deactivating deposits thereon. This deactivation can be partially or at least temporarily compensated for by increasing the reaction temperature. Eventually, however, the activity of the catalyst falls to such a low level that it becomes necessary to regenerate or reactivate the catalyst. It has been proposed to effect the regeneration of such catalysts by discontinuing the supply of reactans, stripping hydrogen and hydrocarbon materials from the catalyst particles with steam or inert gases and then regenerating the catalyst by burning the carbonaceous deposits therefrom with a mixture of air and a diluent such as steam or flue gas to control or limit the temperature reached in burning to the range of from about 850°-1050° F. It has been found that steam, the cheapest diluent, at the 850° F.+ temperature causes the catalyst to lose a significant amount of activity during each regeneration.

It is the object of this invention to provide the art with an improved method for regenerating hydrofining catalysts.

It is also the object of this invention to provide the art with a method for regenerating hydrofining catalysts which eliminates or avoids the permanent loss of activity that occurs in normal air-steam regeneration procedures.

These and other objects will appear more clearly from the detailed specification which follows.

It has now been found that the significant loss in activity that occurs during each regeneration at 850° F.+ with steam-air mixtures can be avoided by limiting the peak regeneration temperature to 700°-750° F. It has been further found, moreover, that the burn-off of carbonaceous material at the lower temperatures is almost the same as at higher temperatures. This results in the complete recovery of the inherent activity of the catalyst. The resultant higher activity of the regenerated catalyst allows the subsequent hydrofining reactions to proceed at lower temperatures. This in turn results in lower in-cycle deactivation rates giving longer cycles. In addition, more cycles are made over the total life of the catalyst.

The regeneration procedure in accordance with this invention is as follows. It will be understood that the hydrofining reactor is a typical fixed bed unit which is preferably of the downflow type but can be upflow and which may be provided with scale traps, a layer of inert balls or other means for distributing the incoming vaporous streams and for protecting the catalyst particles from attrition by said incoming vapor streams.

To effect regeneration, the supply of naphtha or other hydrocarbons to the hydrofiner is cut off while preferably continuing the supply of hydrogen-containing treat gas to purge the reactor of hydrocarbons. Steam is passed through coils in a furnace to heat the same to about 450° F. while by-passing the reactor. When the treat gas purge has been completed and the steam is at the desired temperature, the supply of treat gas to the reactor is discontinued and steam is cut into the reactor at substantially atmospheric pressure and the reactor effluent is run to a flare until hydrogen is purged from the system. Reactor tmperatures may be anywhere between 250 and 700° F. at the start of the purge whereby the condensation of steam within the catalyst bed is avoided.

When hydrogen is purged from the system, the reactor effluent is run to a stack as large as possible and as near to the reactor outlet as possible in order to minimize back pressure and hence the pressure in the reactor. With the inlet portion of the catalyst bed at a temperature of about 400° F., air is gradually cut into the entering steam until a 6 vol. percent air-94 vol. percent steam mixture is being fed to the reactor. Temperature beyond the first few feet of the bed is immaterial since it will line out before the flame front reaches it. Catalyst temperature in the burning zone should be about 700° F. and the concentration of air in the regeneration gas mixture should be adjusted to maintain this temperature. This type of regeneration will give burning over a wide portion of the bed. Consequently, initial oxygen break-through does not signify the end of regeneration. When the catalyst bed temperature at the bottom or outlet end of the vessel is approximately the same as the inlet steam or steam-air mixture temperature, regeneration is complete. Oxygen content of the exit dry gases should be over 20%. In the event that burning is not initiated by the foregoing procedure, air content should be gradually increased to 10%. If burning still is not initiated the inlet temperature should be gradually increased until burning starts. This will be indicated by an increase in the temperature at the inlet of the bed. When burning starts, the inlet steam temperature and air content should be adjusted to maintain a 700° F. burning zone temperature.

When regeneration is complete, i.e. when outlet gas temperature is about the same as the inlet steam temperature, the supply of air is discontinued and pure steam at 450° F. is fed to the reactor until the outlet gases are free of oxygen. During this period, if connections are available, it is desirable to reverse the direction of flow of steam in the reactor in order to "fluff" the catalyst and reduce the pressure drop through the reactor vessel. It is preferable to avoid excessive movement of the catalyst bed and accordingly the pressure drop for upflow operation should be considerably less than the weight of the catalyst bed, possibly as low as one half.

When the catalyst bed has been stripped of oxygen, it is prepared for resumption of the on-stream phase. Ordinarily, and in the case of hydrofining of naphtha feeds to platinum hydroforming operations, it is necessary to dry the hydrofining catalyst bed by discontinuing the supply of steam and passing a dry inert gas such as nitrogen, methane or natural gas to lower the water content to below 3%. When the catalyst is dry, the reactor is gradually brought up to reactor temperature and pressure by the circulation of treat gas therethrough and when reaction conditions are established, feed is cut in, in order to resume processing.

The following example is illustrative of the present invention.

Example I 100 cc. of a hydrofining catalyst comprising 13.5% $MoO_2$ and 3.5% $CoO$ dispersed upon an activated alumina support that was deactivated by accumulation of 8.5 wt. percent of carbon thereon was regenerated by contact with a mixture of 3% air (0.6% oxygen) in steam at 11 p.s.i.g. The regeneration was effected at different temperature levels by externally controlling the temperature of the catalyst bed. Each regeneration was effected by charging 140 gms./hr. of steam per 100 cc. of catalyst. Upon completion of the respective regenerations, the supply of air was discontinued. Air was stripped from the catalyst by continuing the supply of steam. Steam supply was discontinued and the reactor was pressured by circulating hot hydrogen-rich treat gas thereto while discharging the treat gas to a flare to purge the system. The regenerated catalyst was then tested for activity for desulfurizing diesel oil.

| Feed stock | Hydrofining conditions |
| --- | --- |
| 400/670° FVT<br>35.2° API<br>1.29% Sulfur | 700° F.<br>200 p.s.i.g.<br>1,000 s.c.f./b. Treat Gas Rate Using 70% $H_2$ Concentration, 2 v./Hr./v. |

The regeneration conditions used and the activity levels relative to the fresh catalyst are summarized in the following table,

| Regen. Temp. | Regen. Time, Hrs. | Carbon on Catalyst, Wt., Percent | Surface Area, m.²/gm. | Sulfur [1] in Prod., Wt. Percent | Relative Vol. Percent Activity |
| --- | --- | --- | --- | --- | --- |
| 650–850–1,050 [2] | 26 | 8.6<br>0.035 | 254<br>236 | 0.099 | 94 |
| 700 | 47 | 0.156 | 253 | 0.092 | 100 |
| 800 | 16 | 0.049 | 253 | 0.104 | 89 |
| 900 | 20 | 0.033 | 250 | 0.146 | 63 |

[1] Sulfur values are corrected for minor differences in space velocity during the activity tests.
[2] This is the previously recommended pilot plant procedure: Burn with 5% air at 650° F. until burning is essentially complete; then with 10% air at 850° F. until essentially complete; finally with pure air at 1050° F. In the example cited above, the corresponding times were 16, 4 and 6 hours, respectively. Commercial units are regenerated at more severe conditions, 900° F.+.

Example II

The low temperature regeneration procedure (725° F.) was demonstrated over several cycles by alternately hydrofining a diesel oil and regenerating in an adiabatic reactor. The catalysts used were commercial cobalt oxide-molybdenum oxide on alumina catalysts. The hydrofining of the diesel oil stocks was effected at about 775° F., 200 p.s.i.g. with about 500 s.c.f./b. of treat gas containing 50% $H_2$ and a liquid feed rate of 2 v./v./hr. In each case regeneration of the catalyst was effected with air-steam mixtures at about 725° F. After three such regenerations or cycles, the activity of the cobalt molybdate catalyst for desulfurizing diesel oil was 100% of its initial fresh value when tested at 700° F., 2 v./v./hr., 200 p.s.i.g., 1000 s.c.f./b. of treat gas containing 70% $H_2$. High temperature regeneration techniques previously used reduced activity to 77% of initial after the same number of regenerations. In the case of naphtha hydrofining three low temperature regenerations gave an activity of 84% of its initial fresh value for naphtha desulfurization when tested at 500° F., 7 v./v./hr., 250 p.s.i.g., 500 s.c.f./b. of treat gas containing 70% $H_2$, while after three high temperature regenerations the activity of the catalyst is reduced to 15% of its initial activity.

It may be readily seen that the low temperature regeneration in accordance with the present invention gives the most active regenerated catalyst.

The foregoing description contains a limited number of embodiments of the present invention. It will be understood, however, that numerous variations are possible without departing from the scope of this invention as defined in the following claims.

What is claimed is:

1. A method for regenerating cobalt oxide-molybdenum oxide on alumina catalysts which have become deactiavted by the accomulation of carbonaceous deposits thereon in the hydrofining of hydrocarbon fractions which comprises stripping the spent catalyst with steam at temperatures above about 250° F., increasing the temperature of the steam to about 350–450° F., adding limited amounts of air to the steam in order to burn the carbonaceous deposits therefrom, correlating the temperature of incoming steam and the amount of air added to limit the peak catalyst regeneration temperature to 700–750° F., stripping the regenerated catalyst and resuming the hydrofining of hydrocarbon fractions therewith.

2. A method for regenerating cobalt oxide-molybdenum oxide on alumina hydrofining catalysts which have become deactivated by the accumulation of carbonaceous deposits thereon in the hydrofining of hydrocarbon fractions which comprises discontinuing the supply of oil feed to the hydrofining catalyst while continuing the supply of hydrogen-rich treat gas thereto until the reactor is purged of hydrocarbons, discontinuing the supply of treat gas to the reactor and supplying steam at about 350–450° F. and at substantially atmospheric pressure to purge hydrogen from the system, adding limited amounts of air to the steam entering the reactor in order to burn the carbonaceous deposits on the catalyst, correlating the temperature of the incoming steam and the amount of air added thereto to maintain the temperature of the catalyst in the burning zone at between 700 and 750° F., continuing the supply of air and steam to the reactor until the temperature of the outlet gases is about the same as the inlet gas mixture, discontinuing the supply of air and passing pure steam at 400°–450° F. through the reactor until the outlet gases are free of oxygen, discontinuing the supply of steam and resuming the hydrofining of hydrocarbon fractions therewith.

3. The process as defined in claim 2 in which about 6 vol. percent of air is added to the steam to burn off carbonaceous deposits.

4. The process as defined in claim 2 in which the steam purge following regeneration is carried out by passing the steam through the catalyst bed in the direction opposite to that in which the air-steam mixture for burning is supplied.

5. The method which comprises treating hydrocarbon fractions with a hydrogen-rich treat gas at elevated temperatures and pressures in contact with cobalt oxide-molybdenum oxide on alumina catalysts until the catalyst becomes deactivated by the accumulation of carbonaceous deposits thereon discontinuing the supply of oil feed to the hydrofining catalyst while continuing the supply of hydrogen-rich treat gas thereto until the reactor is purged of hydrocarbons, discontinuing the supply of treat gas to the reactor and supplying steam at about 350–450° F. and at substantially atmospheric pressure to purge hydrogen from the system, adding limited amounts of air to the steam entering the reactor in order to burn the carbonaceous deposits on the catalyst, correlating the temperature of the incoming steam and the amount of air added thereto to maintain the temperature of the catalyst in the burning zone at between 700 and 750° F., continuing the supply of air and steam to the reactor until the temperature of the outlet gases is about the same as the inlet gas mixture, discontinuing the supply of air and passing pure steam at 400°–450° F. through the reactor until the outlet gases are free of oxygen, discontinuing the supply of steam and resuming the hydrofining of hydrocarbon fractions therewith.

6. The process as defined in claim 5 in which about 6 vol. percent of air is added to the steam to burn off carbonaceous deposits.

7. The process as defined in claim 5 in which the steam purge following regeneration is carried out by passing the steam through the catalyst bed in the direction opposite to that in which the air-steam mixture for burning is supplied.

8. The method as defined in claim 5 in which the hydrocarbon fraction treated is naphtha and the catalyst is dried, after the final steam purge, by passing a dry inert gas through the catalyst bed before resuming the hydrofining of naphtha.

References Cited in the file of this patent

UNITED STATES PATENTS

| | | |
|---|---|---|
| 2,174,510 | Gwynn | Oct. 3, 1939 |
| 2,273,299 | Szayna | Feb. 17, 1942 |
| 2,390,323 | Peck | Dec. 4, 1945 |
| 2,398,175 | Cole | Apr. 9, 1946 |
| 2,398,186 | Loy | Apr. 9, 1946 |